Patented Apr. 7, 1925.

1,532,428

UNITED STATES PATENT OFFICE.

KURT MEYER, OF MANNHEIM, AND LUDWIG ORTHNER, OF FREIBURG-BREISGAU, GERMANY, ASSIGNORS TO BADISCHE ANILIN & SODA FABRIK, OF LUDWIGSHAFEN-ON-THE-RHINE, BAVARIA, GERMANY, A CORPORATION OF GERMANY.

PROCESS OF PRODUCING FORMIC-ACID DERIVATIVES.

No Drawing. Application filed July 3, 1922. Serial No. 572,721.

*To all whom it may concern:*

Be it known that we, KURT MEYER and LUDWIG ORTHNER, citizens of Germany, residing at Mannheim and Freiburg-Breisgau, respectively, Germany, have invented new and useful Improvements in Processes of Producing Formic-Acid Derivatives, of which the following is a specification.

It has been repeatedly proposed to produce formamide by causing carbon monoxid and ammonia to react on each other under various conditions with or without the use of electrical discharge. All attempts, however, led either to complete failure or to the formation only of traces of the product required.

We have now found that carbon monoxid and ammonia can be united to formic acid derivatives, especially to formamide or ammonium formate or mixtures of both said compounds, if they are caused to react under a high pressure of say 20 atmospheres, or better still considerably higher and while employing a temperature above 100 degrees centigrade. Catalysts of most various kinds, such for instance as pumice stone, lumps of clay, alumina, metals, especially copper, or water in various proportions may be employed in order to accelerate the reaction.

The following examples will serve to further explain the nature of our invention which, however, is not limited to these examples.

*Example 1.*

An autoclave capable of withstanding high pressure and filled with lumps of earthenware and having a capacity of about 100 litres is supplied with 16 kilograms of liquid ammonia and carbon monoxid is then forced into the autoclave until a pressure of 150 atmospheres is reached. Then the temperature is raised to 200 degrees centigrade, the pressure increasing thereby to 230 atmospheres and then diminishing in the course of a few hours to 170 atmospheres. Then the mass is allowed to cool, the pressure released and the formamide produced is purified by means of distillation. The gases which escaped the reaction can be employed for new preparation of formamide.

*Example 2.*

Pieces of earthenware are freed from iron by treating them with nitric acid and then coated with a paste of moist, pure copper oxid, dried in vacuo and reduced in a current of hydrogen at about 180 or 200 degrees centigrade. A vessel capable of withstanding high pressure is filled with a mass thus prepared, whereupon 70 parts of liquid anhydrous ammonia and 30 parts of concentrated, aqueous ammonia are introduced. Then carbon monoxid is pressed into, a partial pressure of 90 atmospheres established and the whole is then heated to from 170 to 180 degrees centigrade. The capacity of the vessel is chosen so that the 90 atmospheres of carbon monoxid mentioned correspond to 65 parts by weight thereof. On heating, the pressure rises first to about 250 atmospheres and decreases then to about 140 atmospheres. Formamide mixed with ammonium formate is produced and the formamide can be recovered by distillation.

*Example 3.*

Into an autoclave capable of withstanding high pressure and lined with lead and provided with a stirrer, 60 parts of liquid ammonia and 54 parts of water are forced and then 84 parts by weight of carbon monoxid, the volume of the autoclave being suitably chosen so that a pressure of 120 atmospheres is established. The mixture is then kept at 190 degrees centigrade, while vigorously stirring until the pressure, which first rises, amounts to about 150 atmospheres, at the said temperature. When cool, the mass is worked up and will give 21 parts of formamide and besides 36 parts of ammonium formate. The process can also be made a continuous one, carbon monoxid and ammonia, if desired, also water, being introduced continuously into a suitable apparatus capable of withstanding the pressure and heated to the reaction temperature, whilst the liquid reaction products are continuously withdrawn.

The proportion of ammonium formate produced depends on the quantity of water present.

*Example 4.*

An autoclave lined with lead and provided with a stirrer is supplied with 100 parts of aqueous ammonia of 25 per cent strength and 25 parts of carbon monoxid are forced in so that a high pressure is established. The mixture is then heated to 150 to 160 degrees centigrade until the pressure which first rises no longer diminishes and after releasing the pressure the water is distilled off in a vacuum; in this instance the remainder is ammonium formate.

In either case pure carbon monoxid, as well as mixtures of carbon monoxid with a gas which does not participate in the reaction, such as hydrogen or nitrogen, may be employed; in such cases the pressure of the mixture must be correspondingly higher. As to the material constituting the reaction vessel it is to be mentioned that iron and tin are strongly attacked and are not useful for this reason.

What we claim is:

1. The process of producing formic acid derivatives which consists in causing carbon monoxid and ammonia to react under a pressure of at least 20 atmospheres and at a temperature surpassing 100 degrees centigrade.

2. The process of producing formic acid derivatives which at least partially are composed of ammonium formate, which process consists in causing carbon monoxid and ammonia to react in the presence of water and at a pressure of at least 20 atmospheres and at a temperature surpassing 100 degrees centigrade.

3. The process of producing formic acid derivatives which consists in causing carbon monoxid and ammonia to react under a pressure of at least 20 atmospheres and at a temperature surpassing 100 degrees centigrade and in the presence of water and a contact substance containing copper.

In testimony whereof we have hereunto set our hands.

KURT MEYER.
LUDWIG ORTHNER.